United States Patent
Elliott et al.

(10) Patent No.: US 8,751,797 B2
(45) Date of Patent: Jun. 10, 2014

(54) INTEGRATED CIRCUIT WITH RESTRICTED DATA ACCESS

(75) Inventors: Paul Elliott, Bristol (GB); Tariq Kurd, Bristol (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 1410 days.

(21) Appl. No.: 12/082,046

(22) Filed: Apr. 7, 2008

(65) Prior Publication Data

US 2008/0250228 A1    Oct. 9, 2008

(30) Foreign Application Priority Data

Apr. 5, 2007    (EP) ..................................... 07251526

(51) Int. Cl.
*H04L 29/06*    (2006.01)
(52) U.S. Cl.
USPC .......................................................... 713/164
(58) Field of Classification Search
USPC .......................................................... 713/164
See application file for complete search history.

(56) References Cited

U.S. PATENT DOCUMENTS

| | | | | |
|---|---|---|---|---|
| 4,812,969 | A * | 3/1989 | Takagi et al. ................. | 711/209 |
| 4,942,521 | A * | 7/1990 | Hanawa et al. ............... | 711/128 |
| 5,600,818 | A | 2/1997 | Weikmann | |
| 6,269,439 | B1 * | 7/2001 | Hanaki ......................... | 712/235 |
| 6,745,306 | B1 * | 6/2004 | Willman et al. .............. | 711/163 |
| 2005/0066354 | A1 * | 3/2005 | Dellow et al. ................. | 725/30 |
| 2005/0182919 | A1 * | 8/2005 | Dellow et al. ................. | 712/227 |
| 2006/0015749 | A1 * | 1/2006 | Mittal ........................... | 713/190 |
| 2006/0112241 | A1 * | 5/2006 | Weiss et al. ................... | 711/154 |

FOREIGN PATENT DOCUMENTS

| | | |
|---|---|---|
| EP | 0859319 A | 8/1998 |
| EP | 1507414 A1 | 2/2005 |
| EP | 1548537 A1 | 6/2005 |
| WO | WO 0129672 A1 | 4/2001 |

OTHER PUBLICATIONS

European Search Report, European Patent Office, Oct. 18, 2007.

* cited by examiner

*Primary Examiner* — Michael S McNally
(74) *Attorney, Agent, or Firm* — Graybeal Jackson LLP

(57) ABSTRACT

A semiconductor integrated circuit includes a hardware mechanism arranged to ensure that associations between instructions and data are enforced so that a processor cannot fetch data from an instruction that is not authorized to do so. A Memory Protection Unit stores entries comprising instructions and associated data memory ranges. A hardware arrangement impairs the operation of the circuit if the processor attempts to make a data fetch from an instruction that is outside the range associated with data in a Memory Protection Unit. Such functioning may be by issuing a chip reset. The Memory Protection Unit may be implemented in a Memory Management Unit having an extension so as to store a validity flag. The validity flag may only be set by a secure process such as the CPU well entrusted code or by a separate trusted hardware source.

40 Claims, 8 Drawing Sheets

INTEGRATED CIRCUIT WITH RESTRICTED DATA ACCESS

PRIORITY CLAIM

This application claims priority from European patent application No. 07251526.5, filed Apr. 5, 2007, which is incorporated herein by reference.

TECHNICAL FIELD

An embodiment of the present disclosure relates to integrated circuits including microprocessors and, in particular, to microprocessors used in secure systems such as Pay-TV decoders known generally as set-top-boxes. In such systems, it may be important that the processor does not run unauthorized code as this could weaken the security of the device and would allow code from an authorized device to be run on an un-authorized device, depriving code providers of revenue.

BACKGROUND

Consumer devices for media content, such as conditional access device Pay-TV decoders, typically comprise a processor, cryptographic circuits, memory and inputs and outputs for receiving, decoding and outputting media content signals.

An example of a conditional access device is described in EP 1548537 which is incorporated by reference, and is briefly described in relation to FIGS. 1 to 3 by way of background.

A schematic block diagram of an example of a simplified architecture of a processor and memory arrangement is shown in FIG. 1. A CPU 1 equipped with a cache memory 2 is coupled to a bus 3 communicating with peripheral elements. A RAM 4 containing the code lines of programs is coupled to bus 3. In practice, the programs contained in memory 4 generally originate from a mass storage device 5. To execute several different applications or programs temporarily stored in memory 4, the CPU 1 has a table of correspondence between so-called virtual addresses of the program which are independent from its storage location and so-called physical addresses corresponding to the physical addresses in the memory, for example memory 4, where the different program lines are stored. This correspondence table is generally implemented as a Memory Management Unit (MMU) and comprises buffers designated as a TLB (Translation Look Aside Buffer).

The operation of a Translation Look Aside Buffer (TLB) is schematically illustrated in FIG. 2 showing a correspondence table 10 and the exchanges between the cache memory or register containing this table and the different elements using it. On the side of CPU 1, each time an instruction of a program stored in RAM 4 is executed, this instruction is called by using virtual address VirtAD of this instruction corresponding to the address contained in the program. This virtual address is converted by table 10 into a physical address PhysAD where this instruction is located in RAM 4. RAM 4 then provides the corresponding instruction over the bus 3 (shown in FIG. 1) to the CPU.

If table 10 does not contain the correspondence between the two addresses, the CPU or, more specifically, a calculation program (block 11, CALC) of the operating system calculates a new correspondence line between the virtual address and the physical address, and writes it into correspondence table 10. Each time an application contained in RAM 4 is executed by the CPU, the operating system takes over and uses its internal structures to calculate the correspondence table for the involved program.

The integrated circuit of EP1548537 provides an improved security of execution by implementing a hardware procedure to check code that is to be executed and is shown in FIG. 3 as a schematic representation. The integrated circuit 20 comprises a CPU 22 arranged to execute code from physical memory 24 via a memory management unit 26 (MMU). In particular, the CPU executes code as a "virtualized" process in the sense that the CPU requests portions of code from the physical memory 24 according to addresses specified within the code, and those addresses are translated from virtual addresses in code to the physical address in physical memory 24. This allows, for example, two programs to use the same virtual location, but to be located at different physical locations in memory 24 thereby allowing two programs to run at the same time. The translation of addresses from virtual address to physical is performed within a memory management unit (MMU) 26 which includes a translation lookaside buffer (TLB) 27.

The memory management unit thereby translates virtual addresses to physical addresses, and allows management of memory resources as certain amounts of memory are required by a given program at any one time. The memory 24 is split into pages in known fashion (typically 4-8K portions). The MMU thus manages all translations and the TLB 27 comprises a subset of the translations that are actively required at any given time for the pages of code in memory 24.

When any given program from long-term storage is executed, pages of code are swapped into physical memory 24 and translations created in the TLB 27. As that process and other processes continue, pages are swapped in and out of the physical memory 24 to manage the memory resources. After running for some time, pages of code will be located in physical memory non-contiguously such that pages of code for one program will be mixed with pages of code from another program.

The CPU 22 has two modes of operation. A first mode is known variously as privileged mode or supervisor mode, is the mode in which the CPU executes the core operating system, also known as the kernel 30. A second mode is the user mode also known as non-privileged mode and in this mode the CPU is restricted to certain resources. The integrated circuit addresses the problem of knowing whether any code in the physical memory 24 has been "hacked" such that it is not authentic in the sense that the code was not provided by a trusted party but instead has been replaced by a non-trusted party.

It is important to be able to trust the core operating system or kernel 30 as if this can be trusted then techniques can be devised to ensure that the remaining code is authentic and can also be trusted. Such code could be user programs, for example. However, there is a problem in that the operating system when loaded will run from pages in memory having virtual addresses as previously described and so checking the kernel in physical memory 24 may not be sufficient to ensure that the instructions for the operating system executed by the CPU are authentic. Also if the exception vector is changed then the CPU might run the kernel from a completely different unchecked region. In the arrangement of FIG. 3 the memory management unit 26 is modified to provide security by exposing certain execution parameters on line 29 to a security device shown as instruction monitor 33. The additional security circuit shown as instruction monitor 33 receives the execution parameters, including instruction addresses, CPU operation mode (whether privileged or non-privileged) and a status indication showing that the instruction was executed to completion from the processor 23 and retrieves the instruction from memory 24. The instruction monitor performs a signature check on the code, such as by performing a hash function on the instructions and comparing to a stored signature in a known manner. In the event that the kernel code 30 fails the signature check then the instruction monitor 33 issues a chip reset on line 31.

SUMMARY

It is appreciated that checking code authenticity when executed requires processor power and that a more efficient mechanism to authenticate might be beneficial. It is also appreciated that it may be better to take action to prevent execution of un-authorized code prior to execution, rather than after the fact.

In broad terms an embodiment of the disclosure provides a circuit with hardware enforced associations between instructions and data. A memory protection unit (MPU) within the circuit, typically implemented within a Translation Lookaside Buffer (TLB) within the CPU, stores entries of instruction and data memory ranges and a validity flag indicating the validity of each entry. The memory protection unit can thereby enforce two rules when the CPU attempts to fetch data. First, the entry for the address of the data access is marked as valid within the memory protection unit. Second, the instruction address (program counter) is within a range allowed for the specified data access as defined in the memory protection unit. The first rule is enforced by an instruction fetch unit and the second rule by a load store unit. The terms CPU, microprocessor and processor are used herein interchangeably and refer to a processor on an integrated circuit.

To populate the memory protection unit with the associations between instructions and data, a trusted source may be used in the form of a secure store (such as a RAM) and a hardware mechanism to compare the entries in the memory protection unit and the secure store and to set the validity flag accordingly.

In a system using physical addresses, rather than virtual addresses, the memory protection unit and secure store may be implemented as a single functional circuit to enforce the associations between instructions and data. In this arrangement there may be no need for translation between virtual and physical addresses and so a TLB may not be needed. The embodiment may use a TLB in a virtual address system as this may allow the inventive concept to be applied to existing virtual address based operating systems with an extension to the TLB functionality.

BRIEF DESCRIPTION OF THE FIGURES

One or more embodiments of the disclosure will now be described by way of example and with reference to the FIGS., in which.

DETAILED DESCRIPTION

As already described, an embodiment is an integrated circuit for use in a device requiring security. Such a device could be any device where authenticity of code is important, and particularly include conditional access devices for multimedia content and specifically Pay-TV devices.

An embodiment of the integrated circuit includes hardware arranged to enforce a relationship between instruction code and data. By including hardware that can prevent the processor accessing data based on the origin of instruction fetches, the hardware can prevent execution of instructions that are not from authorized regions prior to execution, rather than after execution as in the known arrangements.

Logical Arrangement

Figure 1:
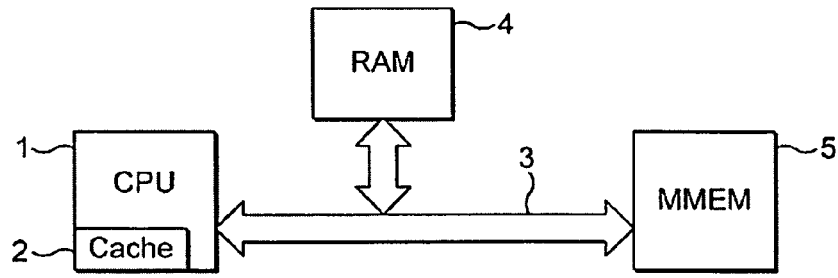
FIG. 1 shows a known architecture of CPU, memory, and store.
Figure 2:
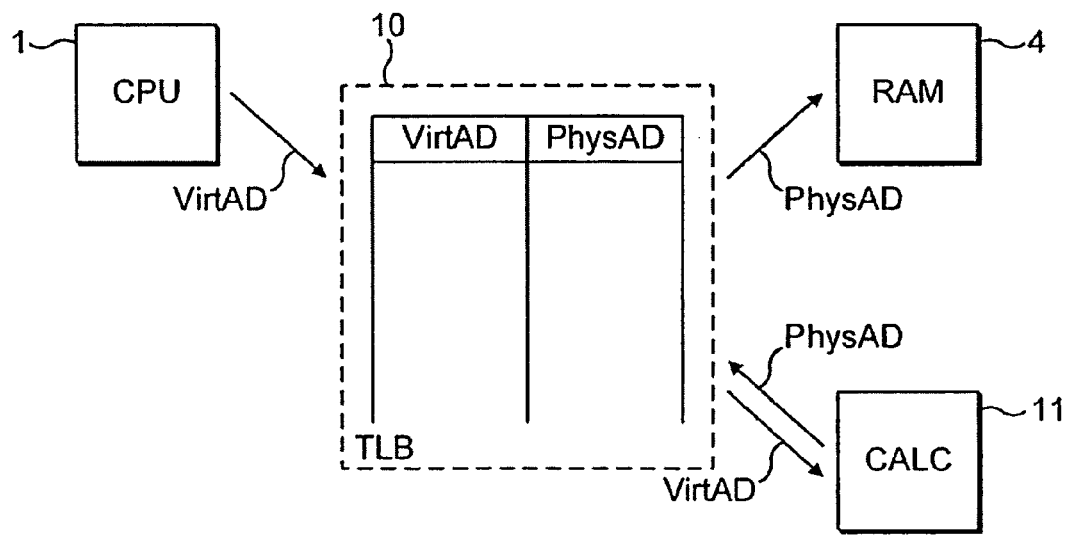
FIG. 2 shows the operation of a translation lookaside buffer (TLB)
Figure 3:
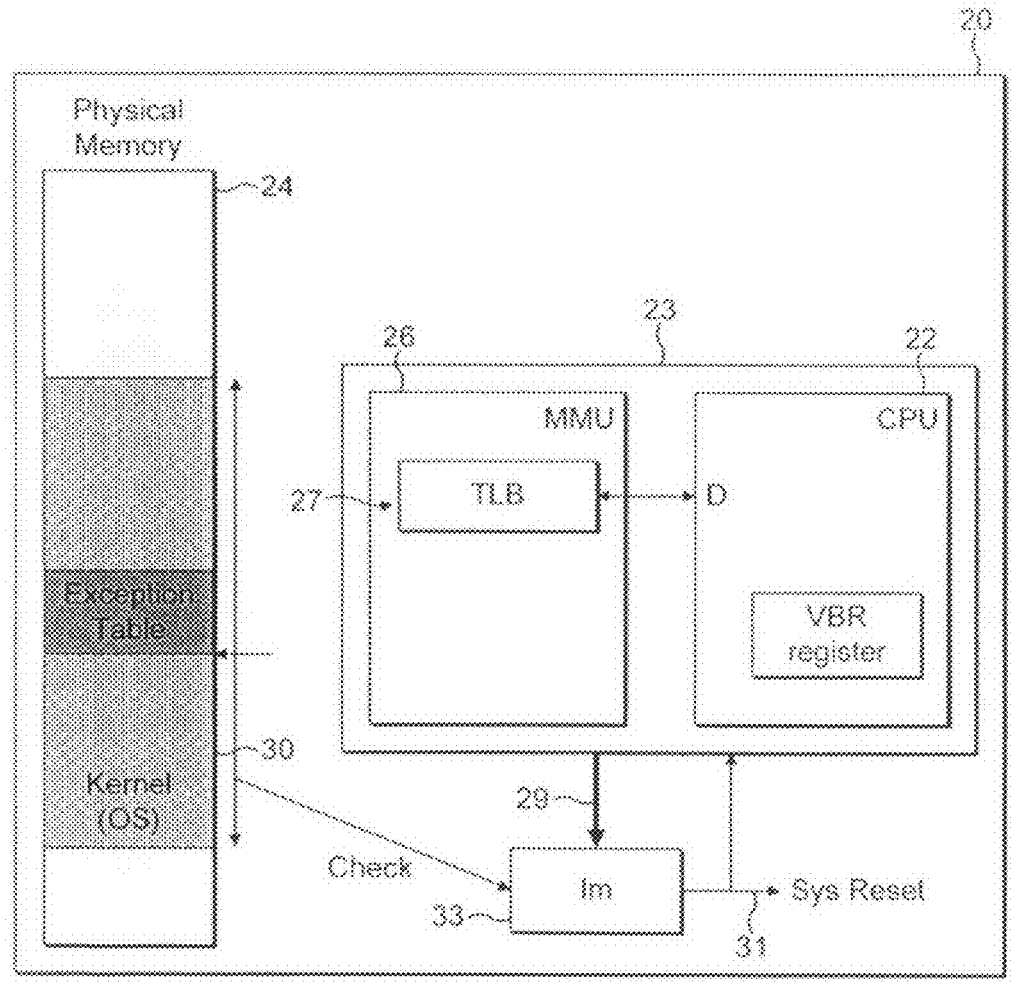
FIG. 3 shows a known integrated circuit which includes an instruction monitor to verify the authenticity of executed code.
Figure 4:
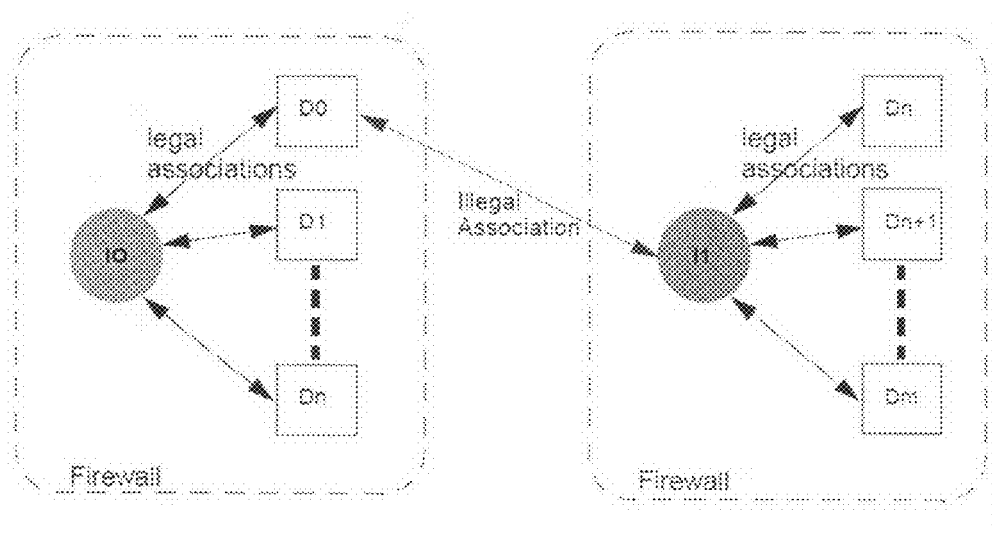
FIG. 4 is a functional diagram showing the benefit of logical isolation of programs provided by an embodiment of the present disclosure.

The enforced relationship will first be described before explaining how this is enforced in hardware. The integrated circuit hardware provides a way to hard link executable code with data and I/O regions; this is illustrated in FIG. 4 for two code regions, I0 and I1. In order for code to operate on a data or I/O region, an association is first created by a trusted process. The trusted process may be a separate cryptographic engine or it could be a protected application on the same processor, for example I0 in the example above. An important point is that the trusted process is secure in the sense that it cannot run unauthorized code as this would allow the trusted process to create inappropriate relationships between instruction code and data. The code and data regions are fixed to the physical address map of the system.

The instruction to data relationship is such that one instruction region can access many data regions, but each data region is accessed by one instruction region.

Once a set of such associations between instruction code and data are created, hardware can enforce access on a per application basis, for example code I0 is more trusted than code I1 and is given the right to talk to security sensitive data regions while I1 is not. In consequence, hardware can enforce isolation between applications; in other words code I1 cannot read or alter data belonging to code I0 and vice versa. This effectively provides a hardware "firewall" between applications which may be important to give security against hacking or simply to prevent a badly written bugged application from over writing data belonging to another application and causing a system crash. An embodiment of the disclosure allows the Instruction/Data associations described above to be securely programmed and enforced and to flag and block any illegal accesses that are attempted.

On initiating a data fetch, an identifier of the instruction that caused the data fetch, typically the program counter (PC) of the instruction, is compared to the already-stored associations between instructions and data. If the PC of the instruction that caused the data fetch is within a range that is stored as a legal association, then the fetch is allowed to continue. If not, a hardware impairment such as an exception or a chip reset is issued.

Hardware Overview

Figure 5:
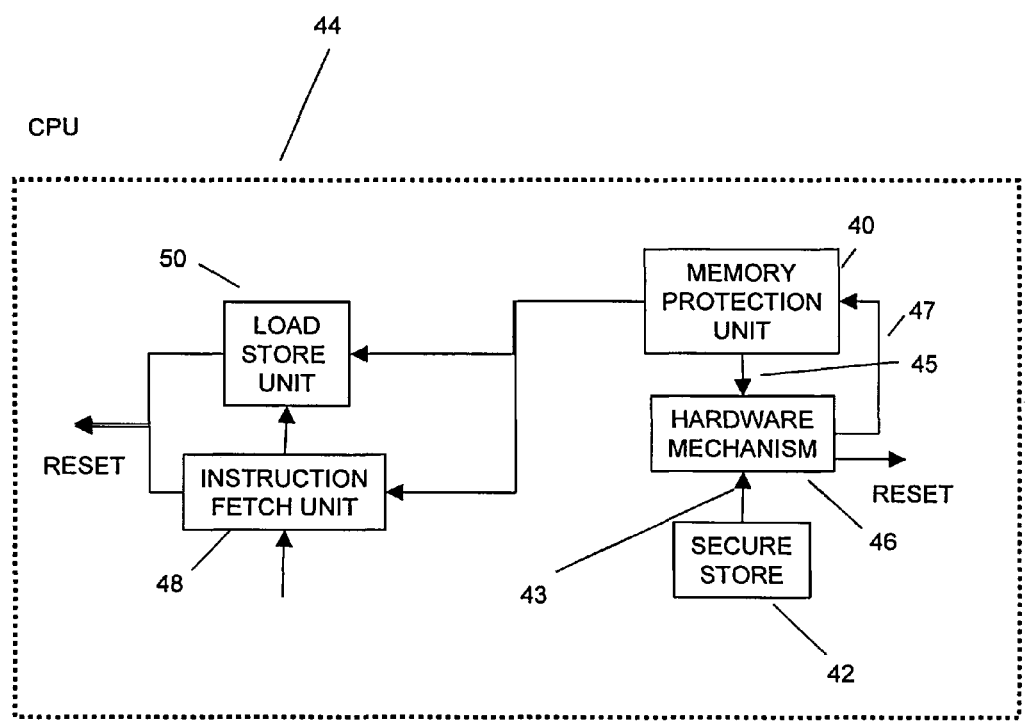
FIG. 5 is a functional diagram showing the main physical components of an embodiment of the disclosure.

The main hardware components of an embodiment of the disclosure are shown in FIG. 5. In this embodiment, a CPU 44 comprises a memory protection unit 40 which, in a virtual address system, is implemented by extending the functionality of a translation Lookaside buffer (TLB). A secure store 42 in the form of a secure RAM stores associations between instructions and data and is used by a hardware mechanism 46 to populate the memory protection unit with flags indicating the validity of each entry.

The arrangement enforces the relationship between instructions and data by having (i) an extension to a Memory Management Unit (MMU) 40 in the form of extensions to a Translation Lookaside Buffer (TLB) to indicate whether instructions are valid and (ii) the secure memory in the form of a secure RAM to store the associations between instruction code and data.

The reason that the secure RAM 42 is separate from the TLB in the MMU 40 is that the TLB is accessible by the operating system (OS) of the circuit and so could be vulnerable to modification by the OS, which may not be a trusted process. The secure RAM can be logically separate from the TLB entries and so can be arranged to be updated by a trusted process and therefore is itself a trusted source indicating which instructions can access which data regions. The functionality of the secure RAM can be implemented as a secure memory region within the CPU or as a physically separate RAM coupled on a bus. An important point is that the secure RAM itself can be updated by a trusted process restricted by a secure hardware pathway.

The hardware mechanism 46 has a first input on a first line, line 43, from the secure store 42 and a second input on a second line, line 45, from the memory protection unit. The hardware mechanism itself may comprise any appropriate arrangement of hardware logic, such as an XOR tree arrangement for comparing entries in the secure store against entries in the memory protection unit. For each entry in the memory protection unit, if the hardware mechanism determines that the entry is valid, a signal is asserted on a line, line 47, to set a validity flag against that entry in the memory protection unit.

The hardware arrangement to enforce the associations between instructions and data comprises an instruction fetch unit 48 and a load store unit 50. If the CPU attempts to access a memory location, the instruction fetch unit (IFU) 48 first retrieves the corresponding entry from the memory protection unit to determine if the fetch is marked as valid. If so, the load store unit (LSU) 50 then checks to see if the program counter (PC) of the instruction is within the range allowed for data access.

Operation of the Circuit

As noted above, the trusted process may be a separate cryptographic engine or it could be a protected application on the same processor. The trusted process in this embodiment comprises the CPU itself executing code from ROM (the code in ROM being trusted as this often cannot be altered). An importance of the source of trust will first be explained with reference to the start up sequence shown in FIG. 6 before explaining the hardware in greater detail.

Figure 6:
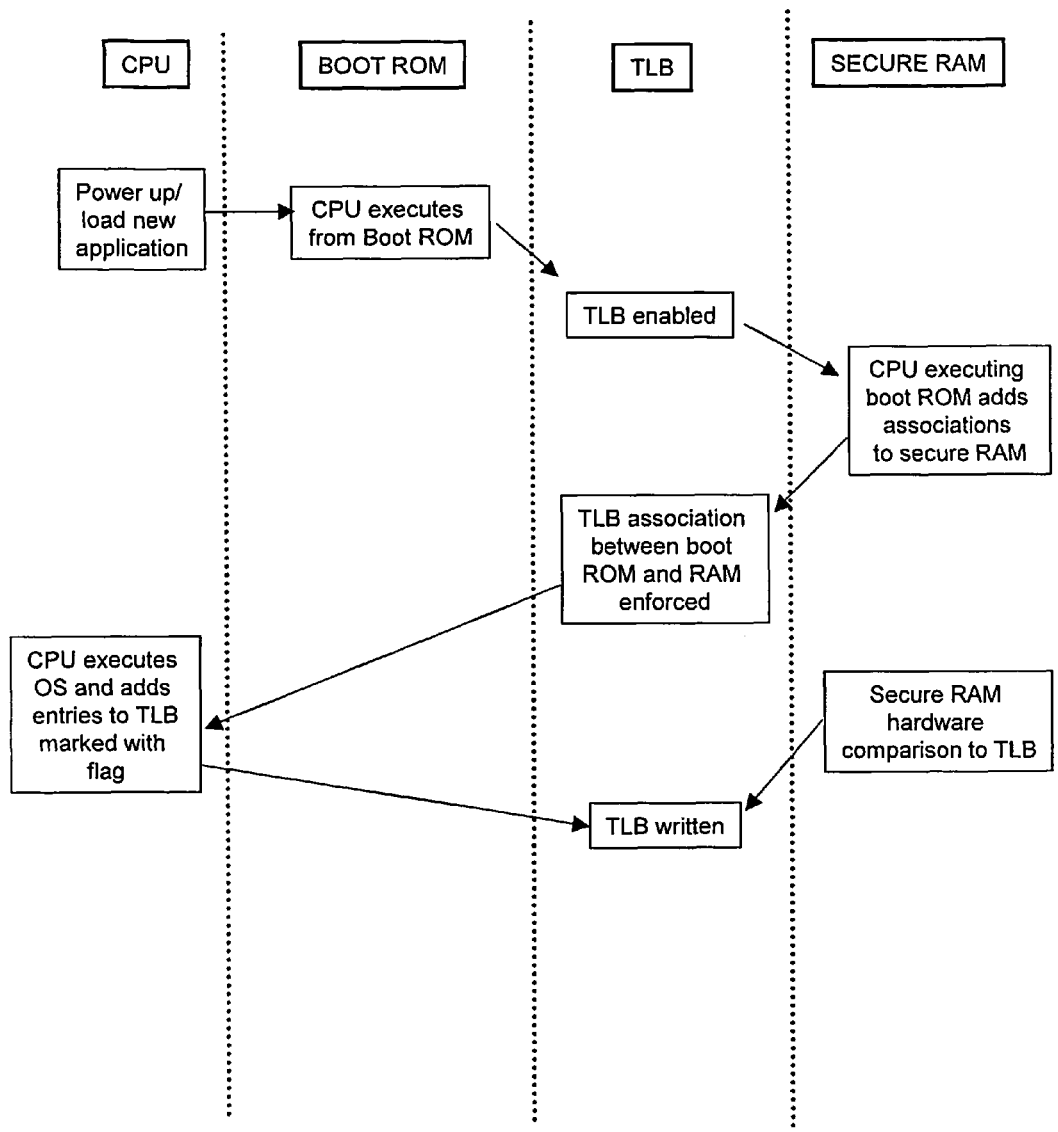
FIG. 6 is a diagram of the process by which a circuit populates the memory protection unit according to an embodiment of the disclosure.

As shown in FIG. 6, on resetting the chip or loading a new application, the CPU executes from boot ROM. The boot ROM contains trusted code and so when executing this code the CPU is a trusted process. The CPU executing the boot ROM then enables the TLB and, still executing the boot ROM, populates the secure RAM with associations between instructions and data. The boot ROM code can cause the secure RAM to be populated and this is enforced by a hard coded association in the TLB. The CPU then jumps to OS code loaded in memory from mass storage. While executing the OS code, the CPU writes entries to the TLB as normal to provide the lookup between physical and virtual addresses for code to be executed. In addition, the hardware of the CPU forces a comparison between the TLB entries and the entries in the secure RAM to determine whether the each TLB entry is valid. Each entry is flagged in the TLB as valid or invalid based on a hardware comparison already described.

Figure 7:
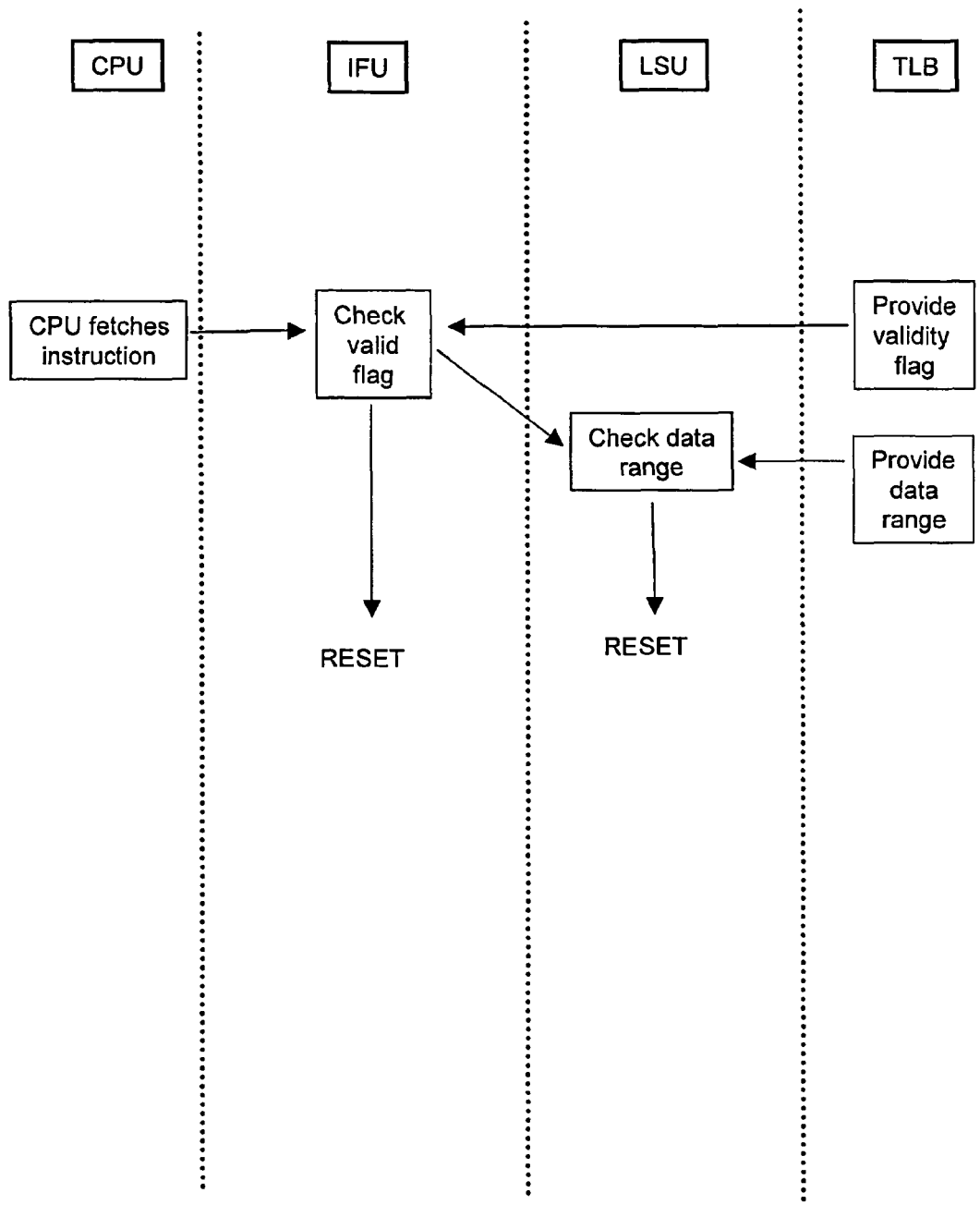
FIG. 7 is a diagram of the process by which a circuit executes data fetches according to an embodiment of the disclosure.

When the CPU executes code, as shown in FIG. 7, it refers to the TLB to determine physical code locations as normal. However, if the CPU attempts to execute an instruction that has been marked as invalid, the functioning of the integrated circuit is impaired by the IFU issuing a reset. Typically, this is by issuing a hard reset to reset the whole circuit, but other mechanisms for impairment may be appropriate. In addition, the PC of the instruction that caused the data fetch is checked against the instruction range for that data specified in the memory protection unit. If that instruction is allowed to access that data, then the LSU 50 allows operation to continue. If not, a reset is issued.

The operation of the circuit thus provides a two-stage check: (i) is the data entitled to be accessed by the instruction? and (ii) is the association of the instruction and the data valid?

Figure 8:
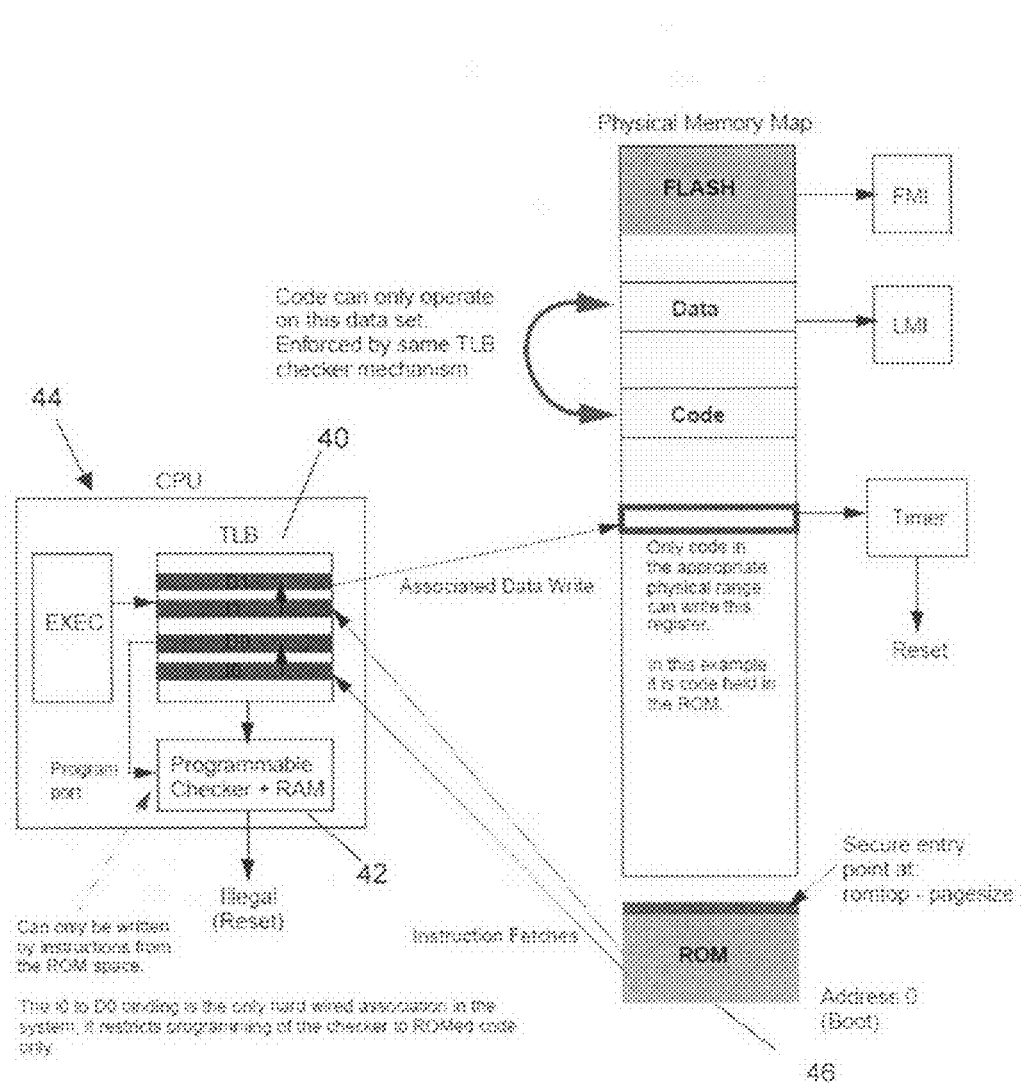
FIG. 8 is a schematic diagram showing an integrated circuit including a processor (CPU) according to an embodiment of the disclosure.

The hardware arrangement by which the relationships between instructions and data are created and enforced will now be discussed in greater detail with reference to FIG. 8. The TLB mechanism described provides a hard link between code segments and data sets based on the physical memory map of the system on chip. As this scheme enforces both association and isolation between code and data sets, an advantage of this approach is that it is possible to run an application that is separated from the main application code and completely secured in hardware such that there is no possibility of interference between the two.

Translation Lookaside Buffer (TLB)

An embodiment is an arrangement using virtual addresses and implementing the memory protection unit as an extension to the TLB. The extensions to the TLB 40 of the MMU associate the physical address of data accesses with the physical PC (program counter) of the instruction making the accesses, and check that the PC is within a specified range. This allows specified code to access specified data. In one hard coded example, specified fixed code (e.g. code in ROM 46) has access to sensitive areas of data.

As mentioned above data accesses are associated with the PC of the instruction causing the access. The regions are programmed via the UTLB on a page by page basis. This means that entire memory can be divided up into insecure and secure regions where necessary, with a minimum granularity of the minimum TLB page size. When a page is marked as being secure then a section of instruction memory is specified in the entry in the secure UTLB and code from this section of memory can access it at all. To be flexible, the size of instruction memory which can access a data region is defined as a base word address and a power of two size, so that the size of code region is not limited to the TLB pages sizes. If any other access is attempted, then the memory access will not be made. Instead the processor will impair the functioning of the circuit. An example of impairing the functioning is to throw an exception that will cause an instant hard reset.

When secure UTLB configurations are programmed by the OS, they are compared against a list of expected secure regions stored within the processor in the secure RAM. This is a hardware comparison by the autonomous hardware mechanism described earlier that cannot be prevented. This hardware comparison is used to ensure the associations between instructions and data stored in the TLB are trusted. In the event that any of the following conditions are met then the page may be marked as invalid in the TLB:

a data page which should be marked as secure has not been a secure data page (discussed later) has any details programmed incorrectly an insecure data page has been marked as secure an insecure data page larger than the minimum size encompasses a smaller secure data page an instruction page which should be marked as having a secure entry point has not been, or has been incorrectly programmed an instruction page has been marked as having a secure entry point when it should not an insecure page larger then 8 k encompasses a smaller page listed in the ROM or secure RAM In any of the above circumstances, it means that the CPU has attempted to write an inappropriate association between instructions and data in the TLB and so it would not be safe to execute such an instruction. If such a page is accessed an exception will be thrown.

The following restrictions may apply when marking pages as secure:

one secure data region can be accessed by one specific instruction region one instruction region can be updated by one other specific instruction region (to prevent code tampering—the first instruction region is considered to be a data region)

instruction regions have unrestricted access to insecure data regions, and can access as many secure data regions as have been programmed All memory regions are specified as physical addresses. The virtual addresses are left to the OS to handle as necessary.

To implement the trusted process using the CPU (rather than a separate secure processor) there may be a hardware constraint to ensure that the CPU can modify the secure RAM when executing from boot ROM. This is implemented within the secure MMU system which this is extended by 2 hard-wired secure entries:

a Dside mapping allowing the system boot ROM to gain access to a secure RAM to setup further secure mappings an Iside secure entry point for the boot ROM The extension of the TLB discussed above could apply to any number of entries, but in the present embodiment, 16 of the 64 general purpose entries (numbered 0 to 15) are extended to have secure fields.

Upon boot the ROM will enable the MMU after configuration has been performed. This enabling may be sticky such that the MMU can never be disabled once this has been done; disabling the MMU may prevent the security measures from being operational.

The boot ROM is the part of the system which can access the secure RAM within the processor (as defined by the first UTLB entry above), and has a secure entry point. Whenever the OS needs to setup another secure region, it calls the boot ROM to do so. The boot ROM will check that the arguments are valid, and will add entries into the secure RAM as required.

When programming memory regions into the UTLB, they are compared against the entries listed in the secure RAM. If the programmed regions are marked as secure by the OS, then all fields must match an entry in the secure RAM exactly. If they match then the UTLB entry will have a hidden bit set denoting that the secure setup has been validated, and the page can be used.

If there are any mismatches then this bit will be cleared denoting that any accesses from the page will cause an exception and system reset upon production. If an insecure page is programmed which overlaps with any region which is secured, then the page will be marked as having an invalid security setup and so any accesses to the page will cause an exception and system reset. In this embodiment, the TLB has 64 entries and entries 0 to 15 in MMU are extended to have 5 more fields (shown in table 1 below). All 64 entries are extended to have the hidden "secure_setup_valid" valid flag:

TABLE 1

| | UTLB Extensions | | | | |
|---|---|---|---|---|---|
| Name | UTLB entry Numbers | Width | Software Visible | Set for I or D pages | Comment |
| Secure_region_base_address | 0-15 | 30 bit | Yes | D | Base word address of the region of code which can access the data TLB page |
| Secure_region_size | 0-15 | 5 bit | Yes | D | Size of the code region, as a power of two ($2^0$ to $2^{31}$) in words |
| Secure_region_enable | 0-15 | 1 bit | Yes | I and D | The page is marked as having security properties |
| Secure_entry_point_enable | 0-15 | 1 bit | Yes | I | An I page has been marked as having a secure entry point |
| Secure_region_ | 0-63 | 1 bit | No | I and D | This bit is invisible to the software. It indicates whether the page has correct security properties programmed. |

To program entries 0 to 16 of the TLB with secure entry point information then the values shown in table 2 below are programmed.

TABLE 2

Secure 1 Page Extension Values

| Name | Value | Comment |
| --- | --- | --- |
| Secure_region_base_address | 0 x 0 | Must be zero |
| Secure_region_size | 0 x 0 | Must be zero |
| Secure_region_enable | 0 x 1 | The page is marked as having security properties |
| Secure_entry_point_enable | 0 x 1 | An I page has been marked as having a secure entry point |

To program a secure data page in the TLB then the following values are to be set:

TABLE 3

Secure D Page Extension Values

| Name | Value | Comment |
| --- | --- | --- |
| Secure_region_base_address | 0 x 0 to 0 x 3fffffff | Base address of the region of code which can access the data TLB page |
| Secure_region_size | 0 x 0 | Size of the code region in 32bit words, as a power of two ($2^0$ to $2^{31}$) |
| Secure_region_enable | 0 x 1 | The page is marked as having security properties |
| Secure_entry_point_enable | 0 x 1 | Must be zero |

Secure pages may not be programmed into entries 16 to 63; any attempts to access the security fields will cause secure_setup_valid to be set to zero—which will lead to a security violation exceptions and reset when the CPU requests the translation from the TLB. Insecure entries may be programmed in entries 0 to 15. To program an insecure entry into entries 0 to 15 then all fields added for security reasons is programmed as zero. To program an insecure page into entries 16 to 63 then no change is required to existing TLB entry programming.

The following checks may be performed against the secure RAM when updating a UTLB entry:
the physical address of the page is compared against the physical addresses of pages in the secure RAM. If there is a match go to step 2 else step 5
the pagesize matches the entry in the table and secure_region_enable is set
if secure_entry_point_enable is set then check that
secure_region_base_address=0x0
and secure_region_size=0x0
If secure_entry_point is clear then check that
secure_region_base_address matches the value in the table
secure_region_size matches the value in the table
for pages greater than minimum size, it is checked that the page does not include a smaller page in the secure RAM.

The final check prevent a malicious user from programming a larger insecure page covering a smaller secure page, and never programming the smaller secure page. In this case insecure accesses could occur.

If all checks pass then the secure_setup_valid bit will be set, otherwise it will be cleared.

Secure RAM

The secure RAM 42 is situated inside the processor, and entries are accessed at specific addresses. Accesses to these specific addresses are made by an internal logic path, and no external access is permitted.

The secure logic path can be any appropriate data pathway such as a private point to point connection or an appropriate bus with security based on a source ID.

Each entry in the secure RAM contains the fields shown in table 4.

TABLE 4

Secure RAM and ROM Fields

| Name | Width | Comment |
| --- | --- | --- |
| TLB_base_physical_address | 30 bit | Start word address of the UTLB page |
| TLB_pagesize | 3 bit | Size of the UTLB page |
| Secure_region_base_address | 30 bit | Base word address of the region of code which can access the data TLB page |
| Secure_region_size | 5 bit | Size of the code region in words, as a power of two ($2^0$ to $2^{31}$) |
| Secure_entry_point_enable | 1 bit | An I page has been marked as having a secure entry point |

Therefore each entry is 69 bits wide. The number of RAM entries could be selected according to the needs of the circuit, but in an embodiment is 16 entries.

It is possible to incorrectly program a page into the secure RAM:
the base address+the region size could be greater than $2^{32-1}$
the page size could be a reserved value
Programming pages in this way will lead to instant system reset on a production system.

Application of an Embodiment

The fact the instructions can be restricted from accessing data opens up the possibility of using one processor to provide two or more independent functions such as both security monitoring and normal application support.

In the example of a system having a separate processor used for code verification as explained in relation to the prior art above, the instruction monitor functionality could be implemented on the CPU. This represents a significant die size and therefore cost saving.

Such a FLASH checking scheme might operate as follows.
the crypto code is stored in a ROM at the bottom of the memory map.
on start up there is one default association, this association allows the ROM code to program further associations into the checker.
a watchdog security timer mapped into the physical address space will issue a system wide reset if not refreshed periodically by the CPU.
on boot the CPU starts execution from address zero at the bottom of the ROM, the first thing it does is to write an association between the ROM code and the security timer physical address into the checker. It then performs an RSA based signature check on the external FLASH memory, if this fails a system wide reset is issued. If successful control is handed over to the application code.
the application then calls the ROM periodically, typically using a timer based interrupt, to perform further signature checks on the FLASH memory. If this function is not called often enough or if the signature check fails a system wide reset is issued. This effectively provides the background checking functionality of the current crypto core.

As well as the basic FLASH checking scheme it is also possible for the host to dynamically request the addition of further FLASH or DDR associations by calling ROM based functions. These functions may use RSA based signature checking to verify the association rights of the code to be added.

Each time a ROM function is called it is called indirectly through a single entry point at the base address of the top ROM page, it is not possible to jump into the ROM code at an arbitrary point as this could circumvent the security scheme. This behavior is enforced by the secure entry point mechanism.

Secure Entry Point

To complete the security of the circuit, a secure entry point scheme is provided which ensures that when critical code routines are called they are always called with the correct entry point.

The following paragraph refers to "control flow changes". These are caused whenever the program execution becomes non-linear. Examples of the causes of control flow changes are procedure calls and returns, conditional branches, unconditional branches, trap handler startup and completion.

Where code has been written to access secure data regions then insecurities could come from maliciously jumping into the middle of the code, causing undesirable accesses to the secure data region. This is solved by the use of a TLB page with a secure entry point. The instruction page in the TLB is marked with the secure entry point flag, indicating that when execution flow moves from outside the page into the page then it commences execution at the start address of the page. Once executing within the page, then control flow changes to other addresses within the page are permitted. If a control flow change causes execution to move from outside the page to any address within the page other than the start address, then an exception is thrown which will cause instant hard reset in a production system. Note that no instructions will be executed within the page if the secure entry point policy is violated.

The secure entry point arrangement is enforced by the instruction fetch unit 48 shown in FIG. 5 in conjunction with the extended TLB providing the memory protection unit 40. The instruction fetch unit 48 knows the page currently under execution and the page to be executed next. On checking the entry in the memory protection unit (as already described), the instruction fetch unit (IFU) determines whether the instruction is one that is required to start at a specified memory range. If the IFU determines that a page is flagged as requiring a secure entry point, then a jump into that page will cause the IFU to issue a reset.

Exception Handler

The OS installs the exception handler in TLB entry 0.

The purpose of this is that the TLB is periodically flushed whenever secure RAM entries are written and the TLB entries re-written in accordance with the secure RAM entries. However, the exception handler is always to be accessible and so this is installed at a location in the TLB that is not flushed, here TLB entry 0.

Alternative Embodiment

The "trusted process" in the embodiment described is implemented by the CPU itself which is trusted because the execution from boot ROM is enforced by hard coded entries in the TLB. An alternative embodiment could be constructed so a separate secure processor can update the secure RAM via a direct connection.

Further Embodiments

Figure 9:
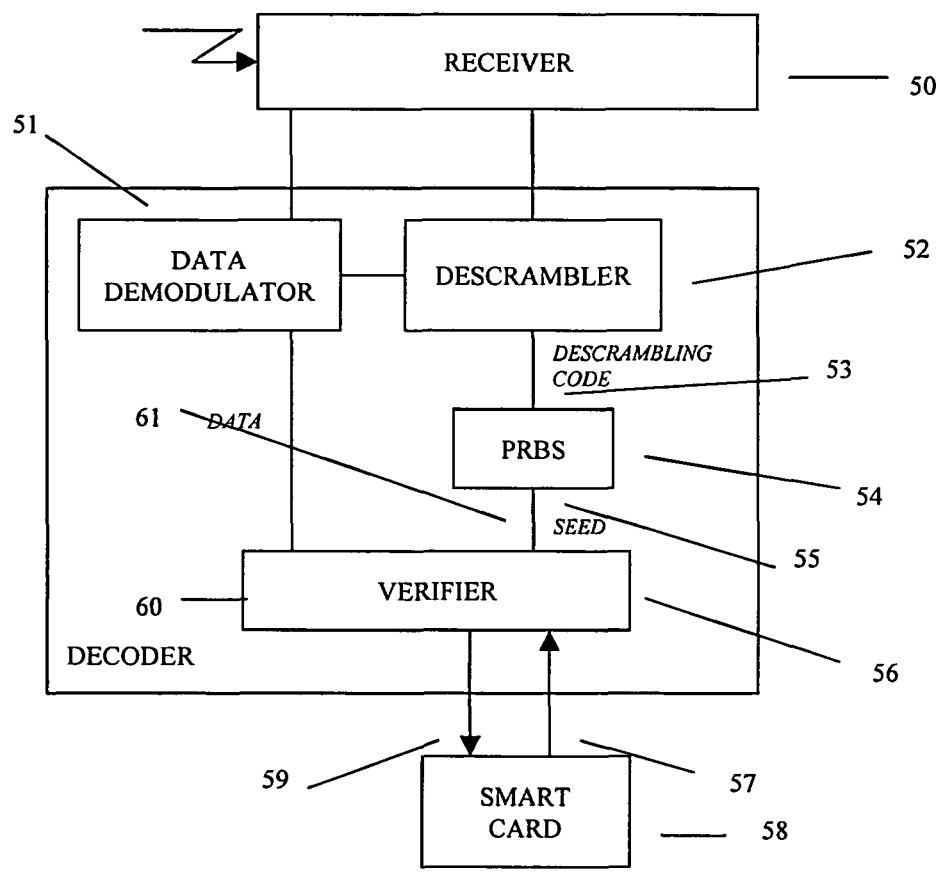
FIG. 9 is a schematic of a system according to an embodiment of the disclosure.

Further embodiments of the disclosure may be embodied in any device in which authenticity of code is important. An embodiment shown in FIG. 9 comprises a processor, memory and output for audio and visual presentation of multimedia data, in particular the device is a decoder for conditional access television otherwise known as a set-top box. The set-top box device comprises a receiver 50 for receiving signals and passing these to a data demodulator 51 and to a descrambler 52. Data is passed to a verifier 60 which exchanges messages to a smart card 58 over lines 59 and 57. The verifier then passes a seed on line 55 to a PRBS 54 which in turn generates a descrambling code and sends this over line 53 to the descrambler 52 which descrambles the audio and/or video signals. The verifier 60 includes a circuit as previously described.

From the foregoing it will be appreciated that, although specific embodiments of the disclosure have been described herein for purposes of illustration, various modifications may be made without deviating from the spirit and scope of the disclosure.

What is claimed is:

1. A semiconductor integrated circuit comprising:
   a processor for executing code comprising instructions from memory including an operating system;
   a memory protection unit arranged to store entries comprising instruction and associated data memory ranges;
   a secure store arranged so that it is only populated by a secure process and arranged to store associations between instructions and associated data;
   a hardware mechanism arranged to provide a comparison between entries in the memory protection unit and entries in the secure store to validate and flag entries in the memory protection unit; and
   a hardware arrangement configured to impair operation of the circuit if the processor attempts to make a data fetch from a validated instruction that is outside a range associated with the data in the memory protection unit.

2. A semiconductor integrated circuit according to claim 1, wherein a hardware mechanism ensures entries in the memory protection unit are marked as valid with a validity flag if there is a match with entries in the secure store.

3. A semiconductor integrated circuit according to claim 1, wherein the hardware arrangement is further configured to impair the operation of the circuit if the processor attempts to make a data fetch if the corresponding entry in the memory protection unit is not marked as valid.

4. A semiconductor integrated circuit according to claim 1, wherein the secure process is arranged to populate the secure store from a trusted source.

5. A semiconductor integrated circuit according to claim 4, wherein the secure process and trusted source comprise the processor executing from boot read-only memory.

6. A semiconductor integrated circuit according to claim 1, wherein the memory protection unit further stores an indication, for each entry, whether a secure entry point is required and the hardware arrangement is arranged to impair the operation of the circuit if execution is attempted within instructions and not commencing at the secure entry point.

7. A semiconductor integrated circuit according to claim 6, wherein the instructions are arranged in pages and the hardware arrangement is arranged to enforce execution commencing at a start of a page marked in the memory protection unit as requiring a secure entry point.

8. A semiconductor integrated circuit according to claim 1, wherein the hardware mechanism is arranged to set a validity flag as invalid for each entry in the memory protection unit if one or more of the following conditions are satisfied:
   a data page which should be marked as secure has not been
   a secure data page has any details programmed incorrectly
   an insecure data page has been marked as secure
   an insecure data page larger than the minimum size encompasses a smaller secure data page
   an instruction page which should be marked as having a secure entry point has not been, or has been incorrectly programmed
   an instruction page has been marked as having a secure entry point when it should not
   an insecure page larger than a minimum buffer size encompasses a smaller page listed in the read-only memory or secure random access memory.

9. A semiconductor integrated circuit according to claim 1, wherein the hardware mechanism comprises a hardware comparator arrangement.

10. A semiconductor integrated circuit according to claim 1, wherein the memory protection unit comprises a memory management unit having fields to store at least data addresses, associated instruction addresses and validity flags.

11. A semiconductor integrated circuit according to claim 10, wherein the memory management unit comprises a translation lookaside buffer having the fields to store the data addresses, associated instruction addresses and validity flags.

12. A semiconductor integrated circuit according to claim 1, wherein the hardware arrangement comprises an instruction fetch unit.

13. A semiconductor integrated circuit according to claim 1, wherein the hardware arrangement comprises a load store unit.

14. A semiconductor integrated circuit according to claim 1, wherein the step of impairing operation of the circuit comprises one of issuing a reset, issuing an exception, or limiting operation of the circuit.

15. A device for decoding multimedia content comprising the semiconductor integrated circuit according to claim 1.

16. A conditional access device for multimedia for decoding conditional access broadcast multi-media signals comprising the semiconductor integrated circuit according to claim 1.

17. A computing circuit, comprising:
   a buffer configured to associate a virtual address of a program instruction with an actual address of the program instruction, and configured to store a flag having a first value if the actual address is a valid address and having a second value if the actual address is an invalid address;
   a processor coupled to the buffer and configured to initiate a fetch of the program instruction by providing the virtual address to the buffer;
   a fetch unit coupled to the buffer and configured to fetch the program instruction from the actual address if the flag has the first value and to generate a first exception indicator if the flag has the second value; and
   a data unit separate from and coupled to the fetch unit and to the processor and configured to retrieve the data from the data address if the program instruction is within an instruction range associated with the data address, and to generate a second exception indicator if the program instruction is outside of the instruction range.

18. The computing circuit of claim 17 wherein the first exception indicator comprises a reset signal.

19. The computing circuit of claim 17, further comprising:
   a check memory configured to store a range of valid actual addresses for program instructions; and
   a comparator coupled to the buffer and to the memory and configured to compare the actual address of the program instruction with the range of valid actual addresses, to generate the flag having the first value if the actual address is within the range of valid actual addresses, and to generate the flag having the second value if the actual address is outside of the range of valid actual addresses.

20. The computing circuit of claim 19, further comprising:
   a non-volatile memory coupled to the processor and configured to store initializing program instructions; and
   wherein the processor is configured to execute the initializing program instructions and to load the check memory with the range of valid actual addresses in response to the initializing program instructions.

21. The computing circuit of claim 17, wherein the program instruction includes a request for data from a data address.

22. The computing circuit of claim 17 wherein the first and second exception indicators comprise a same indicator.

23. The computing circuit of claim 17, wherein the program instruction includes a request for data from a data address; and
   wherein the processor includes a program counter.

24. A system, comprising:
   a first circuit, comprising
      a buffer configured to associate a virtual address of a program instruction with an actual address of the program instruction, and configured to store a flag having a first value if the actual address is a valid address and having a second value if the actual address is an invalid address,
      a processor coupled to the buffer and configured to initiate a fetch of the program instruction by providing the virtual address to the buffer, and
      a fetch unit coupled to the buffer and configured to fetch the program instruction from the actual address if the flag has the first value and to generate a first exception indicator if the flag has the second value; and
      a data unit separate from and coupled to the fetch unit and to the processor and configured to retrieve the data from the data address if the program instruction is within an instruction range associated with the data address, and to generate a second exception indicator if the program instruction is outside of the instruction range; and
   a second circuit coupled to the first circuit.

25. The system of claim 24 wherein the first and second circuits are disposed on a same integrated-circuit die.

26. The system of claim 24 wherein the first and second circuits are disposed on respective first and second integrated-circuit dies.

27. A method, comprising:
   initiating a fetch of a program instruction from an actual address via a virtual address;
   determining at a first check whether the actual address is a valid program-instruction address by checking a flag stored in a separate secure memory;
   determining at a second check whether the program instruction is within a group of instructions allowed to request the data;
   fetching the program instruction from the actual address if the actual address is a valid program-instruction address and if the program instruction is within a group of instructions allowed to request the data; and generating a first error indicator if the actual address is not a valid program-instruction address such that a circuit is prevented from fetching the program instruction.

28. The method of claim 27 wherein determining comprises checking a flag associated with the actual address.

29. The method of claim 27, further comprising:
generating a list of valid actual addresses by executing program instructions stored in a read-only memory; and
storing the list of valid actual addresses in another memory prior to initiating the fetch.

30. The method of claim 27, further comprising:
wherein the program instruction includes a request for data from a data address; and
generating a second error indicator if the program instruction is outside of an instruction range.

31. The method of claim 27, further comprising:
wherein the program instruction includes a request for data from a data address;
determining whether contents of a program counter are within a group of virtual addresses corresponding to the data address, the contents being associated with the program instruction;
retrieving the data from the data address if the contents are within the group of virtual addresses; and
generating a second error signal if the contents are outside of the group of virtual addresses.

32. The method of claim 31 wherein the contents of the program counter compose the virtual address of the program instruction.

33. The method of claim 31 wherein the contents of the program counter compose a virtual address adjacent, with respect to data addressing, to the virtual address of the program instruction.

34. A computing circuit, comprising:
a processor configured to initiate a fetch of a program instruction that includes a request of data from a data address;
a fetch unit coupled to the processor and configured to fetch the program instruction if the program instruction is flagged as valid in a separate flag store; and
a data unit coupled to the fetch unit and to the processor and configured to retrieve the data from the data address if the program instruction is within an instruction range associated with the data address, and to generate an exception if the program instruction is outside of the instruction range.

35. The computing circuit of claim 34 wherein:
the processor includes a program counter; and
the data unit is configured to retrieve the data from the data address if contents of the program counter are within an instruction range associated with the data address, and to generate a second exception if the contents of the program counter are outside of the instruction range, the contents corresponding to a virtual address of the program instruction.

36. The computing circuit of claim 34 wherein:
the processor includes a program counter; and
the data unit is configured to retrieve the data from the data address if contents of the program counter are within an instruction range associated with the data address, and to generate a second exception if the contents of the program counter are outside of the instruction range, the contents corresponding to a virtual address that immediately succeeds, with respect to data addressing, a virtual address of the program instruction.

37. A system, comprising:
a first circuit, comprising
a processor configured to initiate a fetch of a program instruction that includes a request of data from a data address,
a fetch unit coupled to the processor and configured to fetch the program instruction if the program instruction is flagged as valid in a separate flag store, and
a data unit coupled to the fetch unit and to the processor and configured to retrieve the data from the data address if the program instruction is within an instruction range associated with the data address, and to generate an exception if the program instruction is outside of the instruction range; and
a second circuit coupled to the first circuit.

38. The system of claim 37 wherein the first and second circuits are disposed on a same integrated-circuit die.

39. The system of claim 37 wherein the first and second circuits are disposed on respective first and second integrated-circuit dies.

40. A method, comprising:
fetching a program instruction flagged as valid in a separate flag store that includes a request of data from a data address;
retrieving the data from the data address and storing the data in a memory if the program instruction is within an instruction range associated with the data address; and
generating an error indicator if the program instruction is outside of the instruction range such that the data is prevented from being stored in the memory.

* * * * *